2 Sheets—Sheet 1.
C. GEARING.
Process and Apparatus for Manufacturing Heating and Illuminating Gas.
No. 204,555.    Patented June 4, 1878.
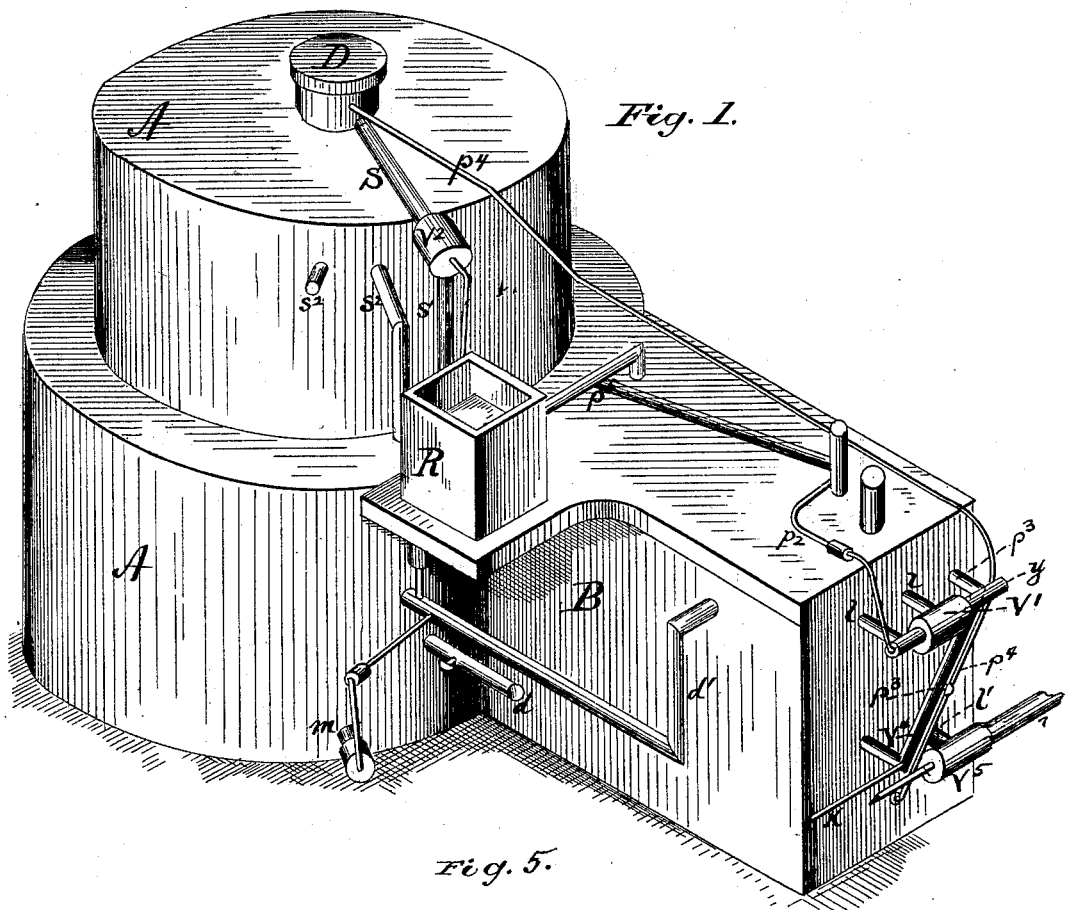
Fig. 1.
Fig. 5.
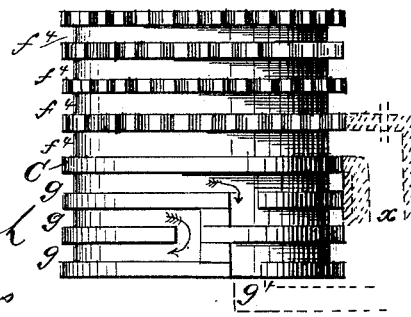
Witnesses
Fred G. Dietrich
Jno P. Brooks
Inventor
Charles Gearing
per Peck & Hosea
Attys.

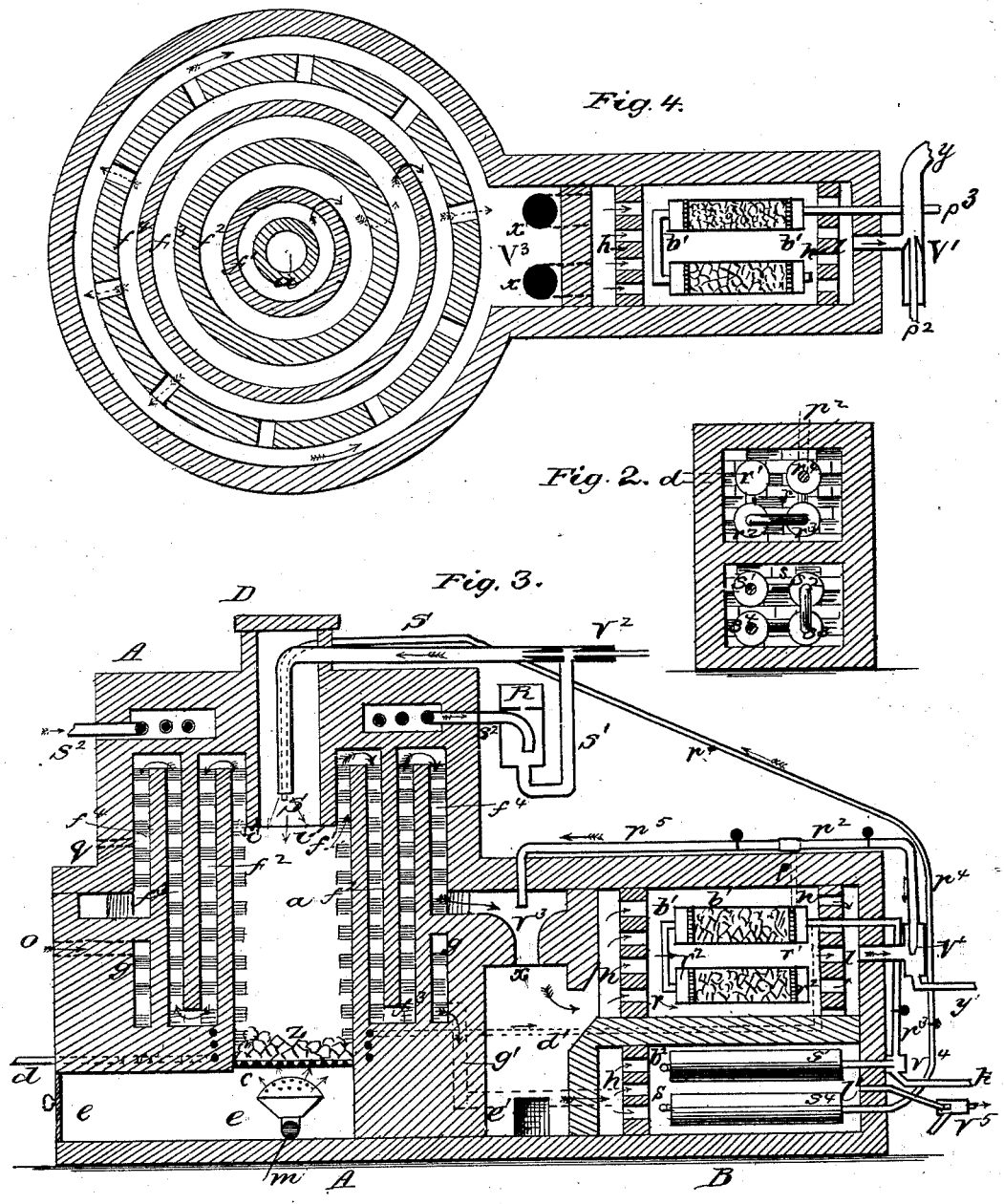

UNITED STATES PATENT OFFICE.

CHARLES GEARING, OF PITTSBURG, PENNSYLVANIA, ASSIGNOR OF ONE-HALF HIS RIGHT TO SAMUEL HARPER, OF SAME PLACE.

IMPROVEMENT IN PROCESSES AND APPARATUS FOR MANUFACTURING HEATING AND ILLUMINATING GAS.

Specification forming part of Letters Patent No. 204,555, dated June 4, 1878; application filed May 15, 1878.

*To all whom it may concern:*

Be it known that I, CHARLES GEARING, of Pittsburg, Allegheny county, Pennsylvania, have invented a new and useful Improvement in Processes and Apparatus for the Manufacture of Gas for Heating and Illuminating Purposes, of which the following is a specification:

In the accompanying drawings, Figure 1 represents a perspective view of my gas-generating furnace and appurtenances. Fig. 2 is an end sectional view, showing the chambers and their benches of retorts. Fig. 3 is a vertical longitudinal sectional view, in which the parts are represented as in the same plane, for convenience of illustration. Fig. 4 is a plan view, showing in section the concentric passages surrounding the combustion-chamber and the upper auxiliary chamber and retorts. Fig. 5 is a side view or elevation of the inner wall of the outer concentric passage, and the horizontal partition and lower air-passage.

My gas-generating furnace or apparatus consists of two main portions, A, which is the generator, in which the necessary combustion is produced and maintained; and B, an auxiliary furnace, containing two distinct chambers, $b^1$ $b^2$, each containing a bench of retorts and their connections. The retorts $r^1$ $r^2$ $r^3$ $r^4$ of the upper chamber are for the superheating and decomposition of steam; and those of the lower chamber, $s^1$ $s^2$ $s^3$ $s^4$, are for the vaporization of petroleum in contact and combination with superheated or decomposed steam, as hereinafter set forth. All the retorts are horizontal cylinders, preferably of metal capable of resisting a pressure of, say, fifty pounds to the square inch, and are filled with silicious bowlders, such as are commonly found in our rivers, contained between inner perforated heads within the retorts, which serve to more thoroughly distribute and mingle the gaseous elements passing through them. In the steam-decomposing retorts $r$ iron fragments of the size of a goose-egg may be interspersed through the bowlders, in the proportion of one-third iron to two-thirds bowlders, with advantageous results.

The main furnace or generator A consists of a cylindrical casing, of boiler-iron or of ordinary brick, within which are concentric partitions of fire-brick, forming annular vertical return-flues around a central combustion-chamber, $a$. Within these concentric flues $f^1$ $f^2$ $f^3$ $f^4$ are fire-brick laid in such manner as to break joints, but leave between each other spaces for the gaseous products to pass around and over them in a general progress through the flues, the object being to subdivide and mingle the gaseous elements, and expose them to as large a heating-surface as possible. The inner space $f^1$ is extended downward a short distance only from the top, the inner partition $i$ $i$ being intended as a throat for the combustion-chamber, and to aid the exit of the gaseous products into and through the concentric spaces. The outer flue $f^4$ is not extended the full depth, but is separated by a horizontal partition, C, below which there is a spiral flue, $g$, used for heating air, as herein set forth.

The combustion-chamber $a$ is connected with the upper chamber $b^1$ of the auxiliary furnace by the series of concentric flues $f^1$ $f^2$ $f^3$ $f^4$ and passage or passages $x$, through which all the products of combustion pass and impart heat to the chamber $b^1$ and its bench of retorts $r$.

The air-flue $g$ terminates in a passage or passages, $g'$, leading to the lower auxiliary chamber $b^2$, by which means heat is supplied to retorts $s$.

$c$ is a vibrating grate at the bottom of combustion-chamber $a$, with an ash-pit, $e$, below, extending through the outer casing, and closed by an exterior close-fitting door. $e^1$ is another ash-pit, located beneath the vertical passage $x$ between the main generator A and retort-chambers $b^1$ $b^2$.

$h$ $h$ $h$ are interior perforated partitions, of fire-brick, near the ends of the retort-chambers, for the more uniform distribution of the heated products passing through the chambers.

S is a blast-pipe, extending vertically downward through the throat $i'$ $i'$, the parts being so arranged that the enlargement or spread of the blast will cover the grate-area beneath.

$d$ is a pipe, laid spirally in the masonry around the lower part of combustion-chamber $a$, for superheating steam preliminary to its admission to decomposing-retorts $r$ by connecting-pipe $d'$.

$S^2$ is a similar pipe, laid in a return-coil in the top arch or casing of A, for superheating the steam used in connection with the carbureting device R. This device consists of a box divided by a horizontal perforated partition into two portions, the upper being a receptacle for finely-pulverized carbonaceous material, and the lower a vacuum-chamber, through which the carbon is fed into the blast-pipe $S^1$, being carried in by a jet of superheated steam issuing through $S^2$ into the mouth of $S^1$ within the vacuum-chamber, and conveyed by pipe $S^1$ into the blast-pipe S, as indicated.

$V^1$ $V^2$ $V^3$ $V^4$ $V^5$ are my vacuum-producing devices, the construction of which, being the same in each, is shown in the drawing, $V^2$ and $V^3$. $V^1$, located at the final outlet $l$ of auxiliary chamber $b^1$, is used to create the artificial draft through the furnace, as hereinafter set forth, and discharge the gaseous product. $V^2$ operates the blast through pipe S and the carbon-feeding pipe $S^1$. $V^3$, between the main generator and the auxiliary chamber $b^1$, is designed to act more directly upon the combustion-chamber $a$ and concentric flues $f$ in aid of siphon $V^1$. $V^4$, the entrance-connection of retort $s^1$ of the lower series, is used for feeding petroleum, with superheated steam, into the retorts $s$, the petroleum being drawn through pipe K from a reservoir. $V^5$, at the final outlet of lower auxiliary chamber $b^2$, is used for exhausting the air therefrom.

D is a close-fitting removable cover, at the top of the combustion-chamber $a$.

$m$ is a pipe with a rose-nozzle, for admitting an upward counterblast of superheated steam, with or without admixture of hydrocarbon vapor, beneath grate $c$.

The retorts of each series $r$ and $s$ are connected together in the order above described, and a pipe, $p^3$, connects the last of series $r$ with the first of series $s$, and is provided with a suitable valve or stop-cock. A pipe, $p$, leads out of retort $r^4$, dividing into branches $p^2$ and $p^5$, the former leading to exhauster $V^1$ and the latter to exhauster $V^3$. A pipe, $p^4$, leads from retort $s^4$ to the mouth of blast-pipe S, and is arranged to discharge concentrically with it. Suitable valves or stop-cocks regulate the flow through the exterior pipes.

$z$ is a layer of bowlders, which I use upon grate $c$.

The steam used is generated in a separate boiler, which, for simplicity of explanation and illustration, I have omitted in the drawings, as I base no claim thereon.

In using my apparatus, I first open cover D and door of ash-pit $e$, and start a fire in the usual manner upon the bowlders $z$. As soon as the coals become ignited I close D and admit a jet of steam through exhauster $V^1$, exhausting by a suitable connection into the air. This produces an artificial draft within the furnace, and draws the products of combustion from combustion-chamber $a$, through the concentric passages $f^1$, $f^2$, $f^3$, and $f^4$, through aperture $x$, into and through the upper chamber $b^1$, as indicated by the arrows. As soon as the combustion-chamber $a$ becomes somewhat heated, so that steam may be superheated in the adjacent pipes $d$ and $S^2$, I close the door of ash-pit $e$, and project through S a blast of steam, superheated by passing through $d$ or through $S^2$, with either of which connection may be made, and at the same time admit pulverized carbonaceous material, such as coal, coke, wood, straw, &c., previously placed in the top portion of box R, to flow down through the perforated partition, whence, by a jet of superheated steam issuing from pipe $S^2$ into the mouth of pipe $S^1$, it is forced through $S^1$, aided by the injector $V^2$, into and with the blast issuing from S. The particles of carbon are at once ignited, and by continuance of the compound blast combustion of most intense character ensues and is maintained, the heated products passing through the concentric spaces $f$ and through the chamber $b^1$, all the parts being soon brought to a high degree of heat, which may be continued and increased to a point beyond the capacity of the most refractory materials to withstand. This, however, I regulate by graduating the amount of carbon and superheated steam admitted and by regulating the outflow, preferring to maintain the concentric partitions and retorts at a bright cherry-heat for continuous use. A small peep-hole, $o$, with stopper, serves to ascertain the heat desired. When this is reached, the gas-making operation is commenced. I then admit steam from superheating-pipe $d$, by pipe $d'$, into the upper series of retorts $r$, passing through all in succession in contact with the silicious bowlders, or bowlders and iron, as the case may be, by which it is partially or wholly decomposed. From retort $r^4$ it is conducted through pipes $p$ $p^5$, and projected into the aperture $x$ in contact with the heated products of combustion, and in aid of the draft through the concentric passages $f^1$ $f^2$, &c., forming at that point an exhauster or injector, $V^3$, which also deposits the slaty refuse in the ash-pit $e^1$. At the same time I admit a counter-blast of superheated steam through pipe $m$, which keeps the bowlders free from any deposit of the carbon or slaty refuse and aids combustion, while protecting the grate from the intense heat of the bowlders $z$ upon them.

By this means the carbon particles are constantly and thoroughly exposed to the action of the heated gases, and the combined products pass over and among the partitions and heated projections to the aperture $x$, where they are again exposed to the action of heated gases issuing through $p^5$, receiving a final accession of decomposed steam at exhauster $V^1$, whence the product is discharged to a holder, purifier, or to the point of use in the form of a hydrogenized carbonic oxide of great heating and considerable illuminating power.

The remaining portion of the apparatus relates to a mode of further enriching the product above described by hydrocarbon gas to increase its illuminating quality. For this purpose I pass a current of raw steam, or superheated steam drawn from coil $d$ or $S^2$, through siphon $V^5$, thus producing an artificial draft through lower retort-chamber $b^2$, which is supplied by air drawn through the outer casing at $q$, into and through passages $g$ and $g'$, being highly heated by contact with the partition-walls, and imparting its heat to any desired degree to the retorts $s$. When these are heated to cherry-heat I pass through injector $V^4$ into retort $s^1$ a jet of decomposed steam drawn from retort $r^4$, which at the same time carries in with it a quantity of petroleum drawn through feed-pipe K, and vaporized by contact with the heated steam-gases. These elements, in passing through the series of retorts S, are combined into a hydrocarbon gas by contact with the heated bowlders, which product is conveyed thence by pipe $p^4$ and discharged in and with the blast through S, before described, and takes part in the subsequent combinations, resulting in a final product of gas of an exceedingly rich illuminating power.

The hydrocarbon gas generated as above described may also be used as part of the counter-blast through $m$, and the heated air drawn by siphon $V^5$ through chamber $b^2$ may also be utilized for thinning the product of the first-described operation when designed to be used for fuel purposes.

The processes, apparatus, and results herein set forth and claimed I have reached after many experiments, and have proved the results by repeated and satisfactory tests. It will be seen that the operation is continuous and automatic, and the combustion may be maintained and the gas produced without cessation so long as the supply of steam and of pulverized carbon is kept up, and the intensity and amount of combustion may be regulated exactly to the needs of the operation by suitable valves, as already explained.

I claim as new—

1. The process of manufacturing illuminating-gas and producing the heat necessary to its manufacture in one and the same operation—namely, by projecting into the combustion-chamber of a gas-generating furnace, and passing over a series of heated surfaces adjacent thereto, a blast composed of superheated steam, pulverized carbon, and hydrocarbon gas, previously evolved from the combination of superheated or decomposed steam and petroleum, substantially as and for the purpose set forth.

2. In a gas-generating apparatus, the combination of main generator A, containing a combustion-chamber, $a$, and concentric passages $f^1 f^2$, &c., blast-pipe S, auxiliary chamber $b^1$, with bench of steam-decomposing retorts $r$, and exhausting device $V^1$, with their connecting pipes and passages, substantially as and for the purpose set forth.

3. In combination with the generator A, having combustion-chamber $a$ and concentric passages $f^1 f^2$, &c., blast-pipe S, retorts $r$, and exhaust device $V^1$, the air-heating passage $g$, auxiliary chamber $b^2$, with its bench of retorts $s$, and exhausting device $V^5$, substantially as and for the purposes described.

4. In combination, in a gas-generating furnace, the blast-pipe S, injector $V^2$, and carbureting device R, substantially as and for the purpose described.

5. In a gas-generating furnace such as described, the blast-pipe S and counter-blast pipe $m$, having a rose-nozzle, in combination, arranged and operating substantially as described.

6. The main furnace A, having combustion-chamber $a$, concentric passages $f^1 f^2$, &c., cover D, grate $c$, ash-pit $e$, passage $x$, ash-pit $e^1$, in combination with auxiliary chamber $b^1$ and retorts $r$, substantially as described and shown.

7. In combination with the main furnace A, having combustion-chamber $a$ and passages $f^1 f^2$, &c., cover, ash-pit, auxiliary chamber $b^1$, and retort $r$, the air-heating passage $g$, passage $g'$, auxiliary chamber $b^2$, and retorts $s$, substantially as described and shown.

8. In combination with grate $c$ of the combustion-chamber $a$ of a gas-generating furnace, the layer of bowlders $z$, substantially as and for the purpose described.

Witness my hand this 29th day of April, A. D. 1878.

CHARLES GEARING.

Attest:
L. M. HOSEA,
JNO. D. PATTEN.